US009182160B2

(12) United States Patent
Platt

(10) Patent No.: US 9,182,160 B2
(45) Date of Patent: Nov. 10, 2015

(54) TWO STAGE DEDICATED HEAT RECOVERY CHILLER

(71) Applicant: Mark Platt, Sparta, WI (US)

(72) Inventor: Mark Platt, Sparta, WI (US)

( * ) Notice: Subject to any disclaimer, the term of this patent is extended or adjusted under 35 U.S.C. 154(b) by 203 days.

(21) Appl. No.: 13/902,397

(22) Filed: May 24, 2013

(65) Prior Publication Data

US 2013/0312444 A1 Nov. 28, 2013

Related U.S. Application Data

(60) Provisional application No. 61/651,398, filed on May 24, 2012.

(51) Int. Cl.
*F25B 27/00* (2006.01)
*F25B 39/04* (2006.01)
*F25B 29/00* (2006.01)
*F24F 5/00* (2006.01)

(52) U.S. Cl.
CPC ............ *F25B 39/04* (2013.01); *F24F 5/001* (2013.01); *F24F 5/0017* (2013.01); *F25B 29/00* (2013.01); *Y02E 60/147* (2013.01)

(58) Field of Classification Search
CPC .................. F25B 27/00; F25B 29/003
USPC ............... 62/82, 190, 238.1, 238.3, 238.6
See application file for complete search history.

(56) References Cited

U.S. PATENT DOCUMENTS

| 4,253,300 | A | * | 3/1981 | Willyoung | ............... 60/39.182 |
| 4,708,000 | A | * | 11/1987 | Besik | ............... 62/480 |
| 2008/0276617 | A1 | * | 11/2008 | Mak | ............... 60/728 |

* cited by examiner

*Primary Examiner* — Melvin Jones
(74) *Attorney, Agent, or Firm* — Keith Orum; Orum & Roth LLC

(57) ABSTRACT

A dedicated heat recovery chiller/heater having a two step heat transfer arrangement is set out. A refrigerant to refrigerant heat transfer steep allows for higher temperature lift as compared to prior dedicated heat recovery systems.

1 Claim, 3 Drawing Sheets

TWO STAGE DEDICATED HEAT RECOVERY CHILLER

BACKGROUND OF THE INVENTION

1. Field of the Invention

This invention relates to improvements in heating and cooling systems and relates particularly to improvements in air conditioning and chilling systems. Particularly, the invention relates to a dedicated heat recovery chiller and control systems for such a chiller.

The dedicated heat recovery chiller and control system of the present invention utilizes heat otherwise rejected and wasted from a condenser circuit of a refrigeration system to offset heating load which would otherwise need to be provided from a heating source. This system raises the overall thermal efficiency of a building system, reduces energy consumption overall, and saves energy costs.

Recent developments in air conditioning systems involve the utilization of modular refrigeration units each having an evaporator and condenser in heat exchange relation with the fluid to be cooled and/or heated. With the modular system, each refrigeration unit is provided with headers for supply and return of the heat exchange fluid. A plurality of refrigeration units is connected in parallel, and the heat exchange fluid circulates through each evaporator and condenser heat exchanger.

The control of such a modular system enables individual refrigeration units to be operated in accordance with the load on the system. Thus, in times of high load, all refrigeration units will be operating to provide a specific heating and/or cooling capacity. When the load is reduced, refrigeration units may be down loaded, or made inoperative, thus reducing the operating costs of the system and resting units which are not required.

These units are interconnected and coordinated in the present invention to create a dedicated heat recovery chiller system. In this system, heat normally rejected to atmosphere from the condenser circuit of the refrigeration cycle is instead captured, controlled, and utilized to displace heat load otherwise provided by a conventional heating circuit.

The present invention in particular pertains to improvements in dedicated heat recovery chiller-heaters having multiple stages of heat transfer.

2. Description of the Related Art

In the past, heat from the condenser circuit of an air conditioning system would be rejected to atmosphere, and thereby wasted.

The modular refrigeration system overcomes a number of disadvantages of previous systems, particularly with regard to system breakdowns and system expansion. The modular system also provides substantial economies in being able to operate only those refrigeration units necessary for the load at any particular time. Power is therefore saved in not having to run refrigeration units which are unnecessary, or in running units at lower than optimum peak operating efficiency.

It is desirable to provide a dedicated heat recovery chiller system to improve the overall thermal efficiency of a building system.

It is also desirable to provide an improved heating and/or cooling system for a modular refrigeration system having a multiplicity of refrigeration units in which the flow of heat exchange fluid through the condenser and/or chiller of each unit is dependent on the operating state of that unit.

It is also desirable to optimize the power consumed by a modular refrigeration system when operated at less than maximum capacity by reducing the flow of heat exchange fluid through the system.

It is further desirable to reduce the flow of heat exchange fluid through heat exchangers of modular units which are not operating and, at the same time, maintain substantially constant pressure differentials throughout the heating and/or cooling system.

Finally, it has been desired to arrange for elevated temperatures produced by the system to displace more of the conventional heat load requirements as compared to the temperatures available from conventional prior art systems.

These and other prior art deficiencies are addressed and solved by the present invention.

BRIEF SUMMARY OF THE INVENTION

According to the present invention there is provided a heating and/or cooling system comprising one or more modular dedicated heat recovery refrigeration units each of which has at least one compressor, an evaporative heat exchanger and a condenser heat exchanger, supply and return manifold on each unit for conveying a first heat exchange fluid, the manifold being connected to manifold of adjacent units, supply and return fluid conduit extending between respective supply and return manifold of each unit and the associated evaporative heat exchanger so that the evaporative heat exchangers are connected in parallel across the interconnected manifolds, pump for the first heat exchange fluid, said pump including structure to vary the flow of the first heat exchange fluid, and valve structure to selectively close at least one of the supply and return fluid conduit structure.

In a particular, preferred form of the invention, first and second supply and return manifold are provided for both the evaporator heat exchanger and the condenser heat exchanger of the modular units. The manifold comprise header pipes mounted on each unit with releasable pipe connectors at each end, such as those produced by Victaulic, which enable the header pipes of adjacent units to be connected together. However, it is to be carefully noted that the structure for connecting the pipes may be of any conventional structure. Welded ends, flanged ends, bolted ends, compression couplings, chemical adhesives and/or sealants, and any other standard coupling structure is contemplated by the present invention. The supply and return conduit are connected into the respective supply and return header pipes so as to provide a fluid path from the supply header pipe through the supply conduit, the heat exchanger and return conduit to the return header pipe.

In one embodiment, the dedicated heat recovery chiller/heater is arranged to transfer heat from its condenser site to a hot water loop which supplements the heat delivered to a building load by a main heating plant.

In another embodiment, the dedicated heat recovery chiller/heater structure consists of at least a two-stage arrangement. A refrigerant to refrigerant heat exchanger is employed between two discreet refrigeration cycle loops in order to ultimately produce available heat at a temperature elevated beyond what would be available in a single step system.

In order that the invention is more readily understood, embodiments thereof will now be described with reference to the accompanying drawings.

DETAILED DESCRIPTION OF THE INVENTION

Figure 1:
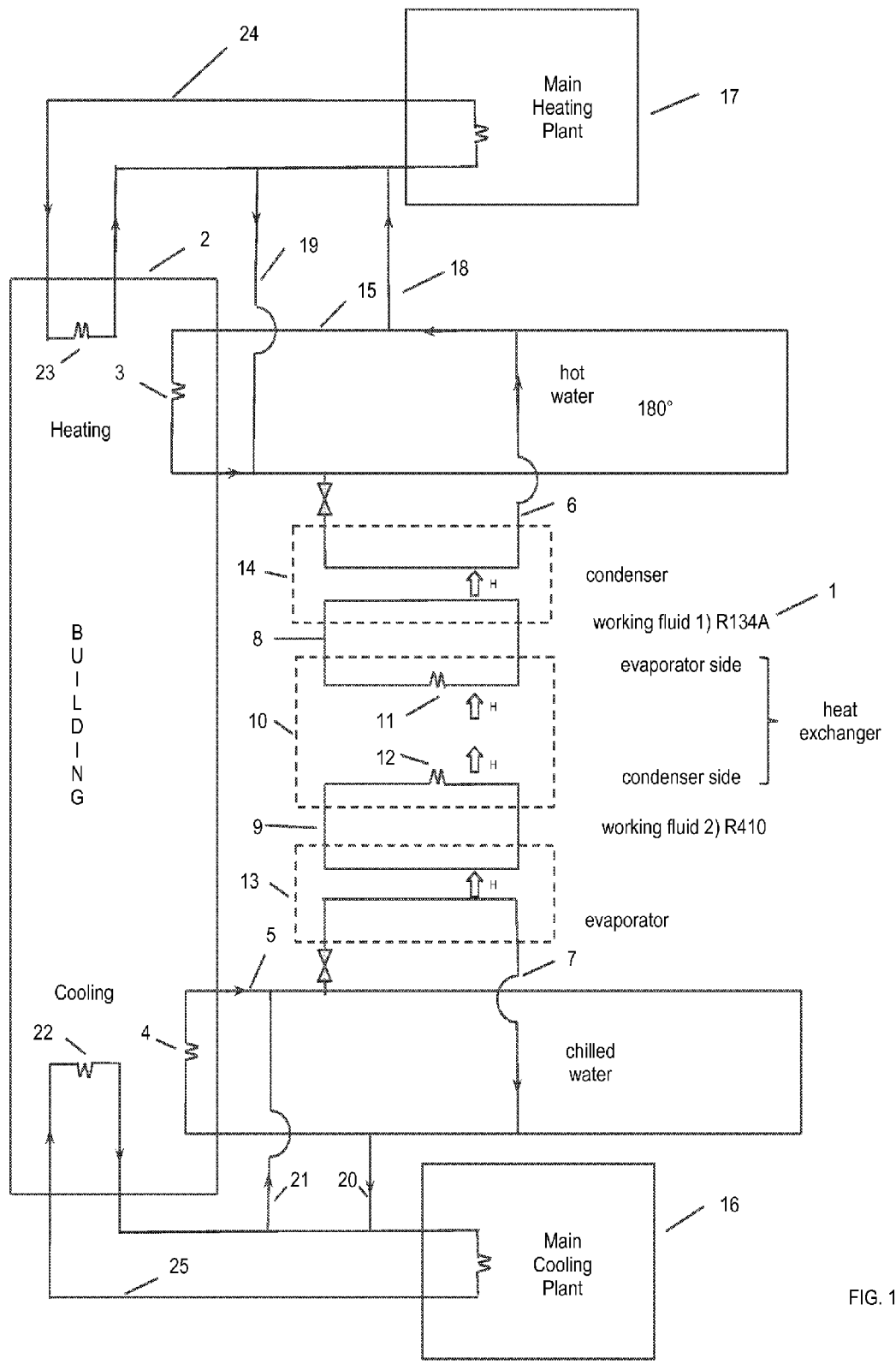
FIG. 1 is a schematic diagram showing the essential elements of a two stage system.

As set out in FIG. 1, a building to be conditioned is serviced by a main cooling plant 16, and a main heating plant 17. One or more dedicated heat recovery chillers 1 are connected to a building conditioning fluid dedicated heat recovery heating loop 15 and a building condition fluid dedicated heat recovery cooling loop 5.

Building conditioning fluid dedicated heat recovery cooling loop 5 may supply cooling directly to the building to be conditioned, and/or may supply precooling to the main cooling plant 16 cooling loop 25.

Building conditioning fluid dedicated heat recovery heating loop 15 may supply heating directly to the building to be conditioned, and/or may supply preheating to the main heating plant 17 heating loop 24.

In the embodiment having a single modular dedicated heat recovery chiller 1, it is arranged to provide high temperature condenser 14 heat to the building conditioning fluid dedicated heat recovery heating loop 15, and low temperature evaporator 13 cooling to the building conditioning fluid dedicated heat recovery cooling loop 5.

Additional modular dedicated heat recovery chillers 1 may be connected in parallel with others, and may be staged according to load requirements.

Figure 2:
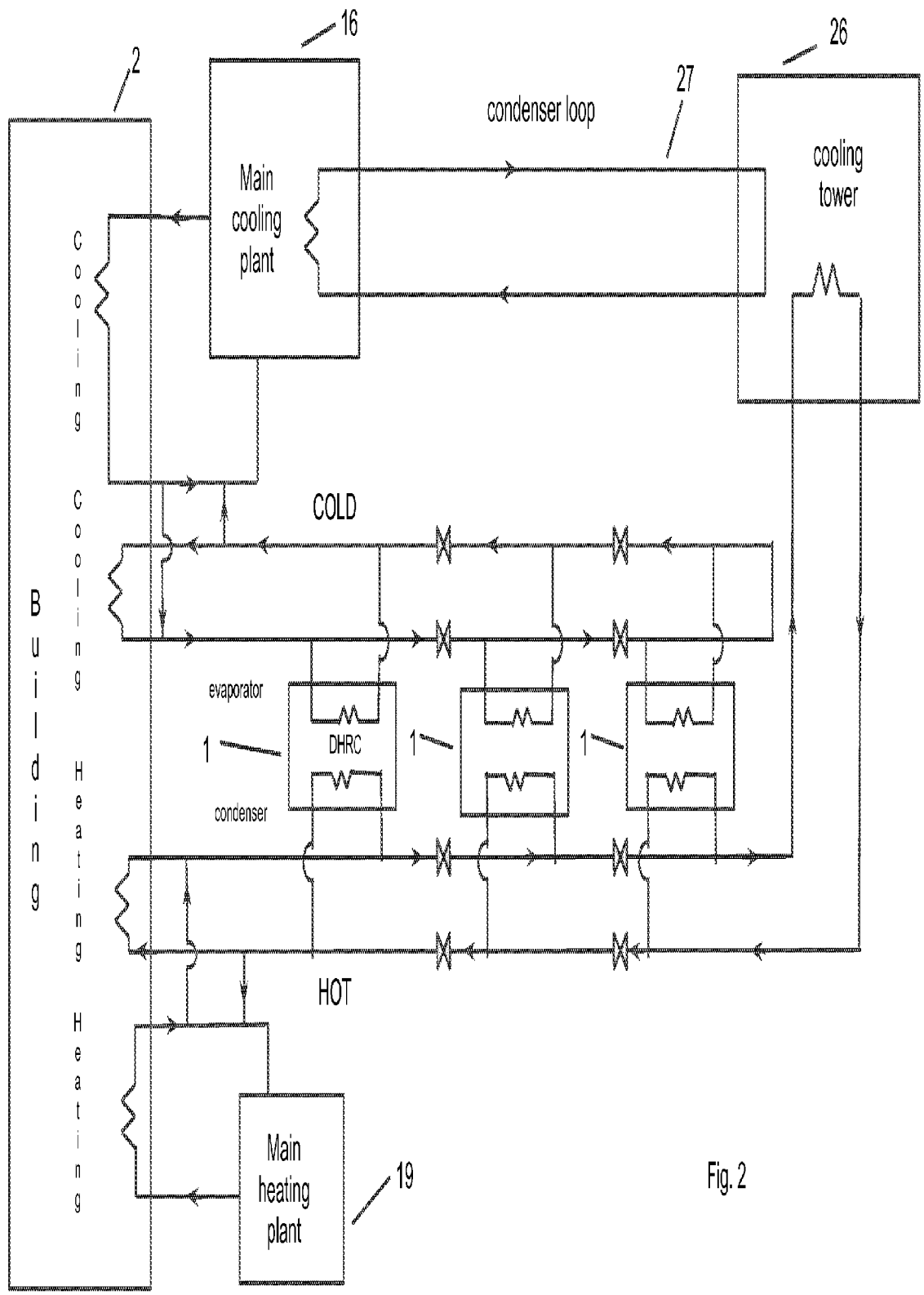
FIG. 2 is a schematic diagram showing the essential elements of a multi stage modular system utilizing heat from a cooling tower.

FIG. 2 illustrates an embodiment having a plurality of two stage dedicated heat recovery chillers connected in parallel.

This figure also illustrates the additional optional element of a cooling tower 26 to dissipate excess heat should the system requirements benefit from the added flexibility of this element.

Figure 3:
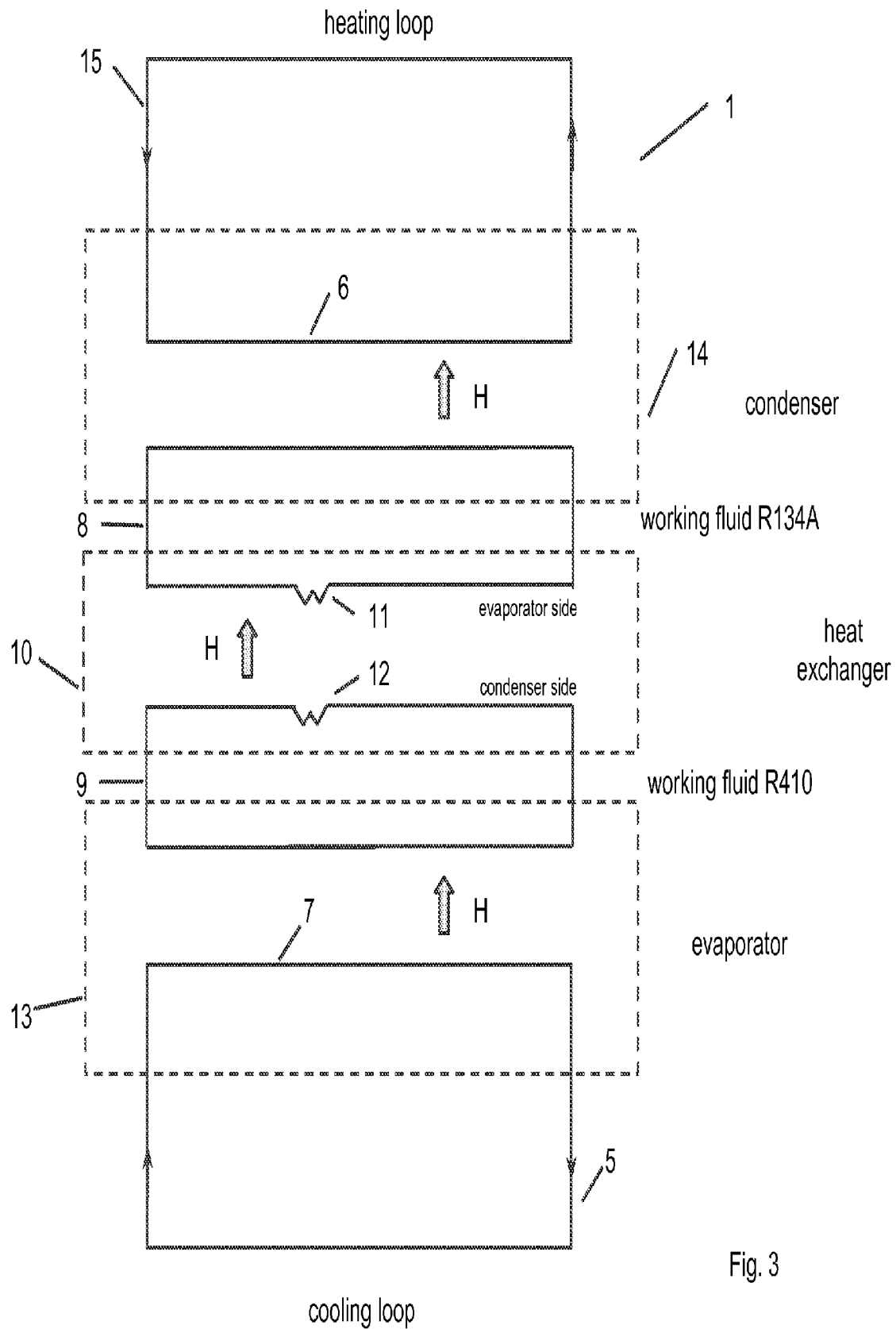
FIG. 3 is schematic diagram showing detailing the refrigerant-to-refrigerant two stage heat exchange cycle.

FIG. 3 sets out a detail of the heat transfer loops of each two stage dedicated heat recovery chillers.

The system includes a refrigerant to refrigerant, or working fluid to working fluid, heat exchanger 10. This heat exchanger receives heat from the building conditioning fluid dedicated heat recovery cooling loop 5 into its low temperature working fluid loop 9, and transfers heat to the high temperature working fluid loop 8. The high temperature working fluid loop 8 transfers heat into the building conditioning fluid dedicated heat recovery heating loop 15.

Working fluids may be carefully selected to maximize the heat transfer effects in the first and second stage, separately. For example, the low temperature working fluid loop 9 may utilize R410 refrigerant, while high temperature working fluid loop 8 may utilize R134A refrigerant. In this way, temperatures at the high temperature working fluid loop may be elevated to 180°, a temperature never before attainable in a dedicated heat recovery chiller heater.

The working fluid to working fluid heat exchanger 10 structure allows heat exchange from one working fluid to a second working fluid, in order to create a higher overall lift in temperature than would be achievable in a single evaporative stage.

The much higher temperatures available, together with the flexibility of a parallel modular dedicated heat recovery chiller heater arrangement, allows for system operation within higher overall thermal efficiency regions for all of the equipment, with the possibility of no heat energy being wasted. The result is greater overall system thermal efficiency, with the related benefits of reduced energy consumption, lower fuel costs, and reduced production of greenhouse gases.

PARTS LIST

1. Two Stage Dedicated Heat Recovery Chiller (DHRC)
2. Building to be conditioned
3. Building DHRC heating heat exchanger
4. Building DHRC cooling heat exchanger
5. Building conditioning fluid DHRC cooling loop
6. Building conditioning fluid condenser loop
7. Building conditioning fluid evaporator loop
8. High temperature working fluid loop
9. Low temperature working fluid loop
10. Working fluid to working fluid heat exchanger
11. Working fluid to working fluid heat exchanger evaporator side
12. Working fluid to working fluid heat exchanger condenser side
13. Low temperature evaporator
14. High temperature condenser
15. Building conditioning fluid DHRC heating loop
16. Main cooling plant
17. Main heating plant
18. DHRC preheat supply
19. DHRC preheat return
20. DHRC precool supply
21. DHRC precool return
22. Main cooling plant building heat exchanger
23. Main heating plant building heat exchanger
24. Main building heating plant heating loop
25. Main building cooling plant cooling loop
26. Cooling tower
27. Cooling tower condenser loop

The invention claimed is:

1. A dedicated heat recovery chiller heater system, comprising: a building conditioning fluid dedicated heat recovery cooling loop, a building conditioning fluid dedicated heat recovery heating loop, a two-stage dedicated heat recovery chiller in fluid connection with said dedicated heat recovery cooling loop on one side and said dedicated heat recovery heating loop on another side, said two stage dedicated heat recovery chiller having a low temperature side, a high temperature side, and a working fluid heat exchanger between said low-temperature side and said high-temperature side, a low temperature evaporator, a high temperature condenser, a low temperature working fluid loop having a low temperature working fluid, a high temperature working fluid loop having a high temperature working fluid, said low temperature evaporator in thermal connection with said low temperature working fluid loop, said low-temperature working fluid loop being in thermal connection with a low temperature side of said working fluid heat exchanger, said working fluid heat exchanger being in thermal contact with said high-temperature condenser, wherein heat is transferred from said building conditioning fluid dedicated heat recovery cooling loop into said working fluid heat exchanger, heat is transferred out of said working fluid heater exchanger into said high-temperature condenser, and heat is transferred from said high temperature condenser into said building conditioning fluid dedicated heat recovery heating loop.

* * * * *